(12) United States Patent
Zhao

(10) Patent No.: US 10,509,219 B2
(45) Date of Patent: Dec. 17, 2019

(54) ELECTROWETTING DISPLAY APPARATUS

(71) Applicant: Boe Technology Group Co., Ltd., Beijing (CN)

(72) Inventor: Weili Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 156 days.

(21) Appl. No.: 14/499,689

(22) Filed: Sep. 29, 2014

(65) Prior Publication Data
US 2015/0355455 A1 Dec. 10, 2015

(30) Foreign Application Priority Data
Jun. 10, 2014 (CN) .......................... 2014 1 0256748

(51) Int. Cl.
G02B 26/00 (2006.01)
G02B 5/22 (2006.01)
G02B 5/20 (2006.01)

(52) U.S. Cl.
CPC ............ *G02B 26/005* (2013.01); *G02B 5/208* (2013.01); *G02B 5/223* (2013.01)

(58) Field of Classification Search
CPC .......... G02B 3/14; G02B 5/208; G02B 5/223; G02B 26/004; G02B 26/005; G02B 2207/115; G09G 3/348
(Continued)

(56) References Cited

U.S. PATENT DOCUMENTS 5,932,104 A * 8/1999 Kawamura .......... B01D 61/145
210/490
2004/0179259 A1 9/2004 Fujii et al.
(Continued)

FOREIGN PATENT DOCUMENTS

CN 101968566 2/2011
CN 102221745 10/2011
(Continued)

OTHER PUBLICATIONS

Office action from Chinese Application No. 201410256748.8 dated Nov. 4, 2015.
(Continued)

*Primary Examiner* — William R Alexander
*Assistant Examiner* — Gary W O'Neill

(57) ABSTRACT

The present disclosure relates to the display technical field and discloses specifically an electrowetting display apparatus, comprising: an electrowetting casing including a black oil layer to which an ultraviolet absorbing material is added; an ultraviolet light source arranged at a lower side of the electrowetting casing, for emitting ultraviolet (UV) light upwards; and a colored fluorescent layer arranged at an upper side of the electrowetting casing. By means of the electrowetting display apparatus in the present disclosure, wherein the ultraviolet light source emits UV light, the ultraviolet absorbing material in the black oil layer absorbs the UV light when the black oil layer spreads, and the colored fluorescent layer displays colors when the black oil layer is applied with electric power and then contracts, such that no colored membrane is necessary to achieve a colored display, and thus an outstanding display effect can be realized.

16 Claims, 2 Drawing Sheets

(58) Field of Classification Search
USPC .......................... 359/290, 291, 297, 665, 666
See application file for complete search history.

(56) References Cited

U.S. PATENT DOCUMENTS

| | | | |
|---|---|---|---|
| 2004/0179295 A1 | 9/2004 | Sato et al. | |
| 2009/0168144 A1* | 7/2009 | Lo ........................ | G02B 26/005 |
| | | | 359/290 |
| 2010/0033798 A1* | 2/2010 | Wang ................... | G02B 26/005 |
| | | | 359/290 |
| 2010/0208328 A1* | 8/2010 | Heikenfeld .......... | G02B 26/005 |
| | | | 359/290 |
| 2012/0170115 A1* | 7/2012 | Zhang ................ | G02B 27/2214 |
| | | | 359/465 |
| 2012/0281269 A1* | 11/2012 | Yang .................... | G02B 26/005 |
| | | | 359/290 |
| 2014/0139507 A1* | 5/2014 | Jung ..................... | G09G 3/348 |
| | | | 345/212 |

FOREIGN PATENT DOCUMENTS

| | | |
|---|---|---|
| CN | 102269867 | 12/2011 |
| CN | 102455505 | 5/2012 |
| CN | 102707430 | 10/2012 |
| CN | 103293661 | 9/2013 |
| CN | 103364940 | 10/2013 |
| CN | 103676137 | 3/2014 |
| CN | 103748510 | 4/2014 |
| CN | 103792659 | 5/2014 |
| WO | 2007/064141 | 6/2007 |

OTHER PUBLICATIONS

Office action from Chinese Application No. 201410256748.8 dated Mar. 18, 2016.
Office action from Chinese Application No. 201410256748.8 dated Aug. 24, 2016.
Office Action from China Application No. 201410256748.8 dated Dec. 1, 2016.

* cited by examiner

ELECTROWETTING DISPLAY APPARATUS

RELATED APPLICATIONS

The present application claims the benefit of Chinese Patent Application No. 201410256748.8 filed Jun. 10, 2014, the entire disclosure of which is incorporated herein by reference.

TECHNICAL FIELD

The present invention relates to the display technical field and particularly to an electrowetting display apparatus capable of colored display.

BACKGROUND

Electrowetting display is a technology in which the display effect is realized by using a non-polar liquid as it has the behaviors of "spreading and contracting" on a hydrophobic dielectric membrane. The principle of operation is as follows: when no voltage is applied to the assembly, the non-polar oil droplets have a greater affinity to the hydrophobic dielectric layer than the polar aqueous solution, which causes the oil droplets to be spreaded in a planar fashion over a surface of the hydrophobic dielectric layer, and when a voltage is applied to the assembly, a distribution of electric charges generated over the hydrophobic dielectric layer would increase its affinity to water such that the oil droplets are squeezed to a corner of pixels.

FIGS. 1 and 2, as shown, are principle diagrams of prior art applications of electrowetting display for a black-and-white display, which comprise from bottom up: a visible-light source 101, a lower substrate 102, a pixel electrode 103, a thin film transistor 104, an insulating layer 105, an oleophilic layer 106, a barrier 107, a black oil layer 108, deionized water 109, an upper substrate 110 and a common electrode 111. In FIG. 1, when no electric power is applied to the black oil layer 108, it is spreaded over the oleophilic layer 106 at this pixel zone, and a visible light emitted by the visible-light source 101 is incident on the black oil layer 108 and absorbed (as shown by the arrow in FIG. 1), thus leading to the display of a black state; in FIG. 2, the pixel electrode 103 supplies electric power to the black oil layer 108, upon which a distribution of electric charges is generated over the oleophilic layer 106 such that good affinity is formed between the water and the oleophilic layer 106 thus squeezing the black oil layer 108 to a corner of this pixel zone, i.e. at the barrier 107, and in this case, the visible light radiated to this pixel zone is not absorbed by the black oil layer 108, but instead reflected by a reflector to display a bright state (as shown by the arrow in FIG. 2).

The above principle of electrowetting display can only achieve a black-and-white display, whereas a colored display requires using a colored membrane, and this does not arrive at a desired colored display effect.

SUMMARY

It is an object of the present invention to provide an electrowetting display apparatus, which is allowed to realize a colored display without using a colored membrane.

In order to solve the above technical problem, the present invention provides an electrowetting display apparatus, comprising:

an electrowetting casing including a black oil layer to which an ultraviolet absorbing material is added;

an ultraviolet light source arranged at a lower side of the electrowetting casing, for emitting ultraviolet (UV) light upwards;

a colored fluorescent layer arranged at an upper side of the electrowetting casing.

Preferably, the electrowetting casing comprises:

a lower substrate, with an upper side of the lower substrate arranged with a thin film transistor and a pixel electrode controlled by the thin film transistor, the ultraviolet light source being arranged at a lower side of the lower substrate;

an insulating layer arranged at an upper side of the pixel electrode;

an oleophilic layer arranged at an upper side of the insulating layer;

a barrier arranged at an upper side of the oleophilic layer;

a black oil layer attached to an upper side of the oleophilic layer;

an upper substrate located above the oleophilic layer, with an upper side of the upper substrate arranged with a common electrode, the colored fluorescent layer being arranged at an upper side of the common electrode;

deionized water filled between the oleophilic layer and the upper substrate.

Preferably, the lower substrate and the upper substrate are both glass substrates.

Preferably, the pixel electrode and the common electrode are both made of a transparent electrically conductive material; the pixel electrode is manufactured into a designated pattern by means of a mask, and the common electrode is a planar electrode.

Preferably, the insulating layer is made of silicon nitride.

Preferably, the oleophilic layer is made of polytetrafluoroethylene (PTFE), fluororesin or polyphenylene ethyl.

Preferably, the barrier is made of a hydrophilic material.

Preferably, the black oil layer is made from adding black dye in alkanes such as a decane or a dodecane, and the ultraviolet absorbing material is titanium dioxide or zinc oxide.

Preferably, the colored fluorescent layer is made of a fluorescence red material, a fluorescence yellow material or a fluorescence green material.

Preferably, the pixel electrode has a thickness of 0.05 µm to 0.07 µm, the common electrode has a thickness of 0.05 µm to 0.07 µm, the insulating layer has a thickness of 0.15 µm to 0.25 µm, the colored fluorescent layer has a thickness of 1.5 µm to 2.5 µm, the barrier has a height of 4 µm to 10 µm and has a width of 2 µm to 5 µm, the black oil layer has a thickness of 1.5 µm to 2.5 µm, and, the oleophilic layer and the upper substrate have a distance of 45 µm to 55 µm between each other.

By means of the electrowetting display apparatus in the present invention, wherein the ultraviolet light source emits UV light, the ultraviolet absorbing material in the black oil layer absorbs the UV light when the black oil layer is spreaded, and the colored fluorescent layer displays colors when the black oil layer is applied electric power and then contracted, such that no colored membrane is necessary to achieve a colored display, an outstanding display effect can thus be realized. In addition, the electrowetting display apparatus of the present invention is reasonably structured, convenient to make and manufacture, and suitable for various types of colored electrowetting displays.

DETAILED DESCRIPTION OF DRAWINGS

The implementation of the present invention will be further described below in detail in conjunction with the accompanying drawings and the embodiments. The following embodiments are used to illustrate the invention and not to limit the scope of the invention.

Among descriptions of the present invention, it should be noted that the terms "upper", "lower", "vertical", "inner", "outer", etc. are intended to indicate directional or positional relationships shown on the basis of the drawings, and are only to facilitate and simplify the description of the invention, rather than to indicate or imply that each of the indicated means or elements must have a particular direction, and be constructed and operated under the particular direction, and accordingly, they should not be construed as limitations to the invention.

In the Figures, 101: visible-light source; 102: lower substrate; 103: pixel electrode; 104: thin film transistor; 105: insulating layer; 106: oleophilic layer; 107: barrier; 108: black oil layer; 109: deionized water; 110: upper substrate; 111: common electrode; 201: ultraviolet light source; 202: lower substrate; 203: pixel electrode; 204: thin film transistor; 205: insulating layer; 206: oleophilic layer; 207: barrier; 208: black oil layer; 209: deionized water; 210: upper substrate; 211: common electrode; 212: colored fluorescent layer.

Figure 1:
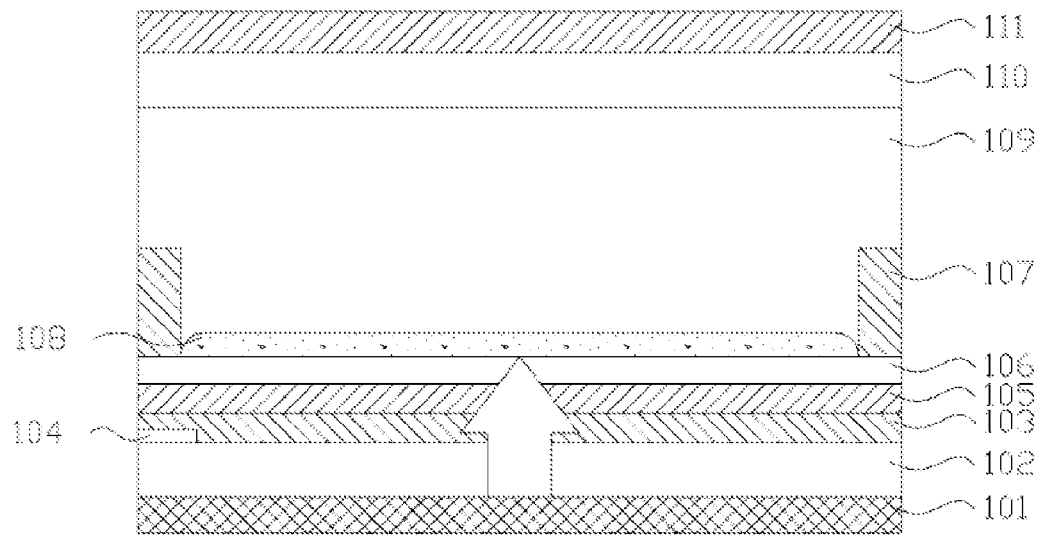
FIG. 1 is a principle diagram of a prior art electrowetting display when no electric power is applied to the black oil layer.
Figure 2:
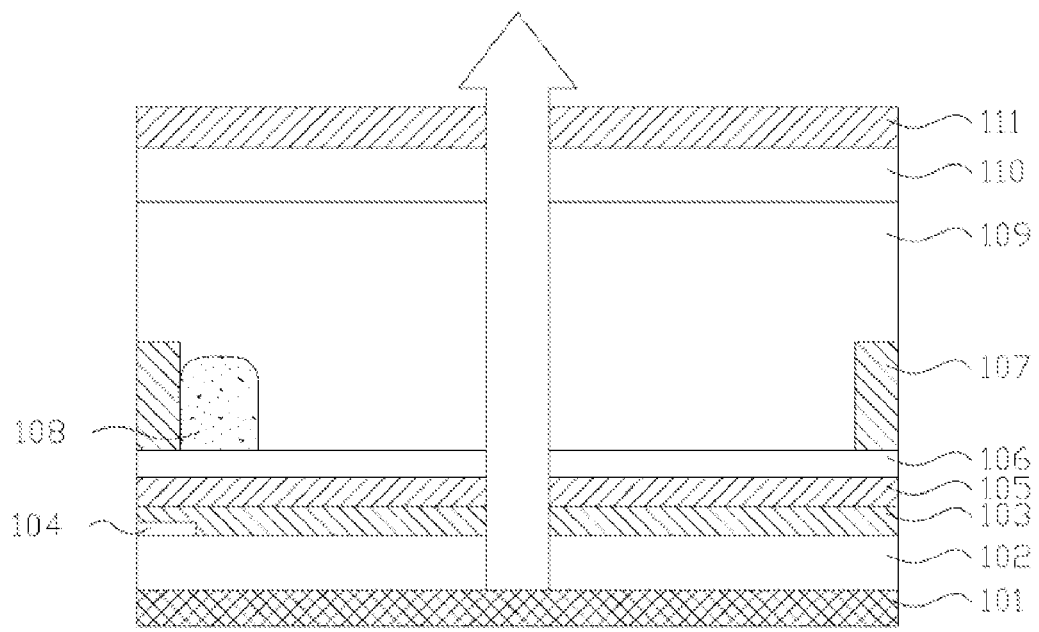
FIG. 2 is a principle diagram of a prior art electrowetting display after electric power is applied to the black oil layer.
Figure 3:
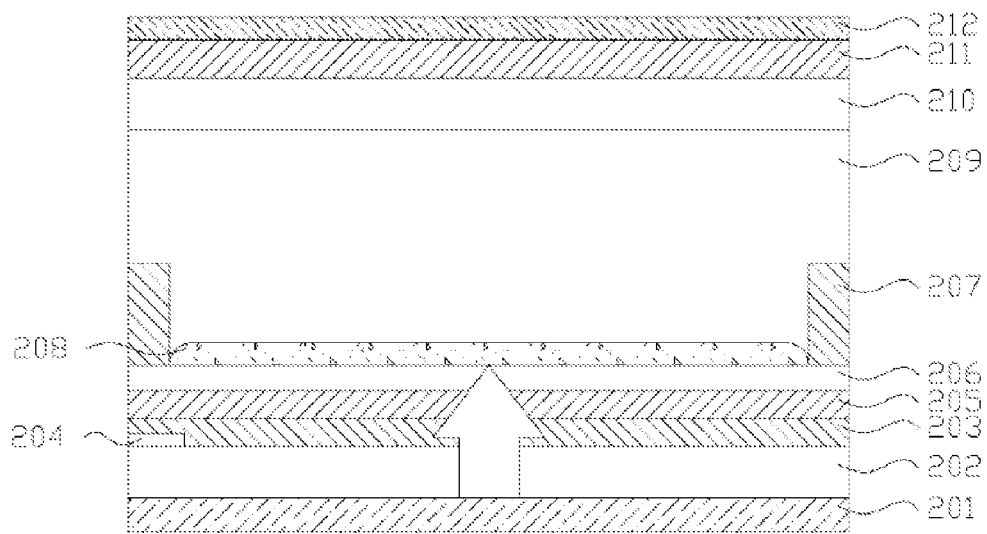
FIG. 3 is a principle diagram of an electrowetting display apparatus according to an embodiment of the present invention when no electric power is applied to the black oil layer.
Figure 4:
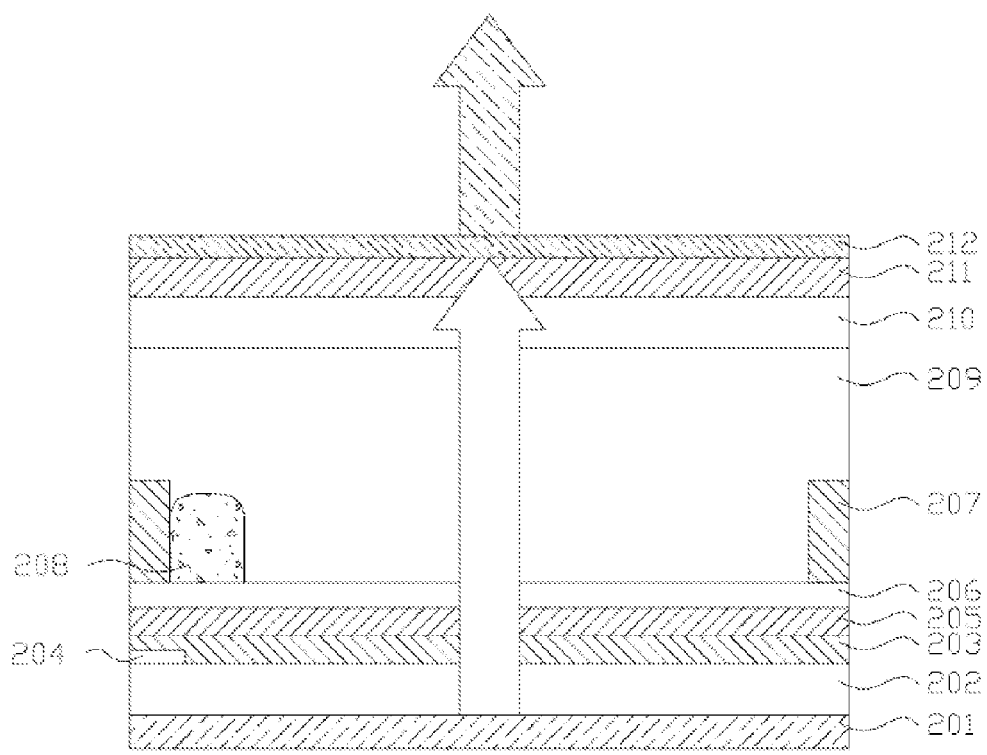
FIG. 4 is a principle diagram of an electrowetting display apparatus according to another embodiment of the present invention after electric power is applied to the black oil layer.

As shown in FIGS. 3 and 4, the electrowetting display apparatus of the present embodiment comprises: an electrowetting casing, an ultraviolet light source 201 and a colored fluorescent layer 212, the electrowetting casing comprising: a lower substrate 202, a pixel electrode 203, a thin film transistor 204, an insulating layer 205, an oleophilic layer 206, a barrier 207, a black oil layer 208, deionized water 209, an upper substrate 210 and a common electrode 211.

Each of the above parts is specifically as follows:

The lower substrate 202 is a glass substrate. A Thin Film Transistor (TFT) 204 and a pixel electrode 203 controlled by the thin film transistor 204 are arranged at an upper side of the lower substrate 202. The pixel electrode 203 is made of a transparent electrically conductive material, such as conductive glass (ITO). The pixel electrode 203 is manufactured into a designated pattern by means of a mask. The pixel electrode 203 controls "spreading and contracting" of the black oil layer by application of a voltage.

The ultraviolet light source 201 is arranged at a lower side of the lower substrate 202, for emitting UV light upwards.

The insulating layer 205 is arranged at an upper side of the pixel electrode 203. The insulating layer 205 is used to prevent the pixel electrode 203 from being conducted through with the common electrode 211 directly by the deionized water 209. The insulating layer 205 is made of an electrically insulating material, such as silicon nitride ($Si_3N_4$).

The oleophilic layer 206 (or hydrophobic layer) is arranged at an upper side of the insulating layer 205. The oleophilic layer 206 is made of polytetrafluoroethylene (PTFE), fluororesin or polyphenylene ethyl, etc., The oleophilic layer 206 has a good affinity to the oil layer (black oil layer 208) when no electric power is applied thereto.

The barrier 207 is vertically arranged at an upper side of the oleophilic layer 206. The barrier 207 is made of a hydrophilic material, such as SU-8 series photoresist. A purpose of the barrier is to separate different pixels and to prevent interferences between the black oil layers in different pixels when the black oil layer 208 is applied electric power and contracted.

The black oil layer 208 is attached to an upper side of the oleophilic layer 206. The black oil layer 208 is made from adding black dye in alkanes such as a decane or a dodecane. The black oil layer 208 is added with an ultraviolet absorbing material, which may be titanium dioxide ($TiO_2$) or zinc oxide (ZnO). When no electric power is applied, the black oil layer 208 exhibits a good attaching force to the oleophilic layer 206, and is spreaded over the upper side of the oleophilic layer 206. Upon the application of electric power, the black oil layer 208 is contracted to a corner of the pixel in proximity to the barrier 207.

The upper substrate 210 is located above the oleophilic layer 206 (having a distance from the upper end of the oleophilic layer 206 or the barrier 207). The upper substrate 210 is a glass substrate. A common electrode 211 is arranged at an upper side of the upper substrate 210. The common electrode 211 is made of a transparent electrically conductive material, such as conductive glass (ITO). The common electrode 211 is not required to be patterned like the pixel electrode 203, and may be a planar electrode instead.

The deionized water 209 is filled between the oleophilic layer 206 and the upper substrate 210.

The colored fluorescent layer 212 is arranged at an upper side of the common electrode 211. The colored fluorescent layer 212 may be made of a colored fluorescent material, such as a fluorescence red material, a fluorescence yellow material or a fluorescence green material. The colored fluorescent layer 212 may emit fluorescent light of corresponding colors upon excitation of ultraviolet light. Fluorescence refers to a luminescence phenomenon of photoluminescence. When a substance at normal temperature is irradiated by an incident light with a certain wavelength (generally ultraviolet light or X ray), it absorbs the luminous energy and enters an excited state, and deexcitation occurs immediately and it then emits an emergent light with a longer wavelength (generally at a waveband of the visible light) than the incident wavelength. Moreover, once the incident light stops, the luminescence phenomenon disappears immediately.

In an electrowetting display apparatus according to a preferred embodiment of the present invention, the dimensions of each part may be set to ranges as follows: the pixel electrode 203 has a thickness of 0.05 μm to 0.07 μm, the common electrode 211 has a thickness of 0.05 μm to 0.07 μm, the insulating layer 205 has a thickness of 0.15 μm to 0.25 μm, the colored fluorescent layer 212 has a thickness of 1.5 μm to 2.5 μm, the barrier 207 has a height of 4 μm to 10 μm and has a width of 2 μm to 5 μm, the black oil layer 208 has a thickness of 1.5 μm to 2.5 μm, and, the oleophilic layer 206 and the upper substrate 210 have a distance of 45 μm to 55 μm between each other.

The colored display principle of an electrowetting display apparatus according to each embodiment of the present invention is as follows. The ultraviolet light source emits UV light upwards, as shown in FIG. 3. When no electric power is applied, the black oil layer 208 is spreaded over the oleophilic layer 206 of this pixel zone, and since the black oil layer 208 is added with an ultraviolet absorbing material, the UV light is absorbed by the black oil layer 208 and cannot be transmitted through the black oil layer 208. In FIG. 4, when electric power is applied to the black oil layer 208, a distribution of electric charges is generated over the oleophilic layer 206, such that good affinity is formed between the deionized water 209 and the oleophilic layer 206 thus squeezing the black oil layer 208 to the barrier 207 at a corner of this pixel zone, whereby the UV light is transmitted through and the colored fluorescent layer 212, upon the excitation, displays corresponding colored fluorescence.

By means of the electrowetting display apparatus in the present invention, wherein the ultraviolet light source emits UV light, the ultraviolet absorbing material in the black oil layer absorbs the UV light when the black oil layer is spreaded, and the colored fluorescent layer displays colors when the black oil layer is applied electric power and then contracted, such that no colored membrane is necessary to achieve a colored display, an outstanding display effect can thus be realized. In addition, the electrowetting display apparatus of the present invention is reasonably structured, convenient to make and manufacture, and suitable for various types of colored electrowetting displays.

The above-mentioned respective embodiments are provided for exemplifying and describing purposes and are not exhaustive or intended for limiting the present invention to the disclosed forms. Many modifications and changes are obvious to those ordinarily skilled in the art. The selection and description of the embodiments are intended to better illustrate the principle and the practical application of the present invention, and to enable those ordinarily skilled in the art to understand the present invention in such a way that a variety of embodiments with respective modifications suitable for particular uses can be designed.

The invention claimed is:

1. An electrowetting display apparatus, comprising:
   an electrowetting casing;
   an ultraviolet light source arranged at a lower side of the electrowetting casing, for emitting ultraviolet (UV) light upwards;
   a colored fluorescent layer arranged at an upper side of the electrowetting casing;
   wherein the electrowetting casing comprises:
      a lower substrate, with an upper side of the lower substrate arranged with a thin film transistor and a pixel electrode controlled by the thin film transistor, the ultraviolet light source being arranged at a lower side of the lower substrate;
      an insulating layer arranged at an upper side of the pixel electrode;
      an oleophilic layer arranged at an upper side of the insulating layer;
      a barrier arranged between individual pixels at an upper side of the oleophilic layer;
      a black oil layer covering an upper side of the oleophilic layer completely between individual barriers, wherein the black oil layer comprises an ultraviolet absorbing material, and the black oil layer is capable of switching between a spreading state and a contracting state;
      an upper substrate located above the oleophilic layer, with an upper side of the upper substrate arranged with a common electrode, the colored fluorescent layer being arranged at an upper side of the common electrode; and
      deionized water filled between the oleophilic layer and the upper substrate.

2. The electrowetting display apparatus of claim 1, wherein the lower substrate and the upper substrate are both glass substrates.

3. The electrowetting display apparatus of claim 2, wherein the pixel electrode has a thickness of 0.05 μm to 0.07 μm, the common electrode has a thickness of 0.05 μm to 0.07 μm, the insulating layer has a thickness of 0.15 μm to 0.25 μm, the colored fluorescent layer has a thickness of 1.5 μm to 2.5 μm, the barrier has a height of 4 μm to 10 μm and has a width of 2 μm to 5 μm, the black oil layer has a thickness of 1.5 μm to 2.5 μm, and, the oleophilic layer and the upper substrate have a distance of 45 μm to 55 μm between each other.

4. The electrowetting display apparatus of claim 1, wherein the pixel electrode and the common electrode are both made of a transparent electrically conductive material; the pixel electrode is manufactured into a designated pattern by means of a mask; and the common electrode is a planar electrode.

5. The electrowetting display apparatus of claim 4, wherein the pixel electrode has a thickness of 0.05 μm to 0.07 μm, the common electrode has a thickness of 0.05 μm to 0.07 μm, the insulating layer has a thickness of 0.15 μm to 0.25 μm, the colored fluorescent layer has a thickness of 1.5 μm to 2.5 μm, the barrier has a height of 4 μm to 10 μm and has a width of 2 μm to 5 μm, the black oil layer has a thickness of 1.5 μm to 2.5 μm, and, the oleophilic layer and the upper substrate have a distance of 45 μm to 55 μm between each other.

6. The electrowetting display apparatus of claim 1, wherein the insulating layer is made of silicon nitride.

7. The electrowetting display apparatus of claim 6, wherein the pixel electrode has a thickness of 0.05 μm to 0.07 μm, the common electrode has a thickness of 0.05 μm to 0.07 μm, the insulating layer has a thickness of 0.15 μm to 0.25 μm, the colored fluorescent layer has a thickness of 1.5 μm to 2.5 μm, the barrier has a height of 4 μm to 10 μm and has a width of 2 μm to 5 μm, the black oil layer has a thickness of 1.5 μm to 2.5 μm, and, the oleophilic layer and the upper substrate have a distance of 45 μm to 55 μm between each other.

8. The electrowetting display apparatus of claim 1, wherein the barrier is made of a hydrophilic material.

9. The electrowetting display apparatus of claim 8, wherein the pixel electrode has a thickness of 0.05 μm to 0.07 μm, the common electrode has a thickness of 0.05 μm to 0.07 μm, the insulating layer has a thickness of 0.15 μm to 0.25 μm, the colored fluorescent layer has a thickness of 1.5 μm to 2.5 μm, the barrier has a height of 4 μm to 10 μm and has a width of 2 μm to 5 μm, the black oil layer has a thickness of 1.5 μm to 2.5 μm, and, the oleophilic layer and the upper substrate have a distance of 45 μm to 55 μm between each other.

10. The electrowetting display apparatus of claim 1, wherein the black oil layer is made from adding black dye in alkanes, and the ultraviolet absorbing material is titanium dioxide or zinc oxide.

11. The electrowetting display apparatus of claim 10, wherein the pixel electrode has a thickness of 0.05 μm to 0.07 μm, the common electrode has a thickness of 0.05 μm to 0.07 μm, the insulating layer has a thickness of 0.15 μm to 0.25 μm, the colored fluorescent layer has a thickness of 1.5 μm to 2.5 μm, the barrier has a height of 4 μm to 10 μm and has a width of 2 μm to 5 μm, the black oil layer has a thickness of 1.5 µm to 2.5 µm, and, the oleophilic layer and the upper substrate have a distance of 45 µm to 55 µm between each other.

12. The electrowetting display apparatus of claim 10, wherein the alkanes are selected from the group consisting of a decane and a dodecane.

13. The electrowetting display apparatus of claim 1, wherein the colored fluorescent layer is made of a fluorescence red material, a fluorescence yellow material or a fluorescence green material.

14. The electrowetting display apparatus of claim 13, wherein the pixel electrode has a thickness of 0.05 µm to 0.07 µm, the common electrode has a thickness of 0.05 µm to 0.07 µm, the insulating layer has a thickness of 0.15 µm to 0.25 µm, the colored fluorescent layer has a thickness of 1.5 µm to 2.5 µm, the barrier has a height of 4 µm to 10 µm and has a width of 2 µm to 5 µm, the black oil layer has a thickness of 1.5 µm to 2.5 µm, and, the oleophilic layer and the upper substrate have a distance of 45 µm to 55 µm between each other.

15. The electrowetting display apparatus of claim 1, wherein the pixel electrode has a thickness of 0.05 µm to 0.07 µm, the common electrode has a thickness of 0.05 µm to 0.07 µm, the insulating layer has a thickness of 0.15 µm to 0.25 µm, the colored fluorescent layer has a thickness of 1.5 µm to 2.5 µm, the barrier has a height of 4 µm to 10 µm and has a width of 2 µm to 5 µm, the black oil layer has a thickness of 1.5 µm to 2.5 µm, and, the oleophilic layer and the upper substrate have a distance of 45 µm to 55 µm between each other.

16. The electrowetting display apparatus of claim 1, wherein the oleophilic layer is made of one of fluororesin and polyphenylene ethyl.

* * * * *